March 9, 1926.

H. J. HALLORAN

GRAVITY LEVEL

Original Filed Feb. 12, 1924　2 Sheets-Sheet 1

1,576,437

H. J. Halloran
Inventor

By Clarence A. O'Brien
Attorney

March 9, 1926.
H. J. HALLORAN
GRAVITY LEVEL
1,576,437
Original Filed Feb. 12, 1924    2 Sheets-Sheet 2
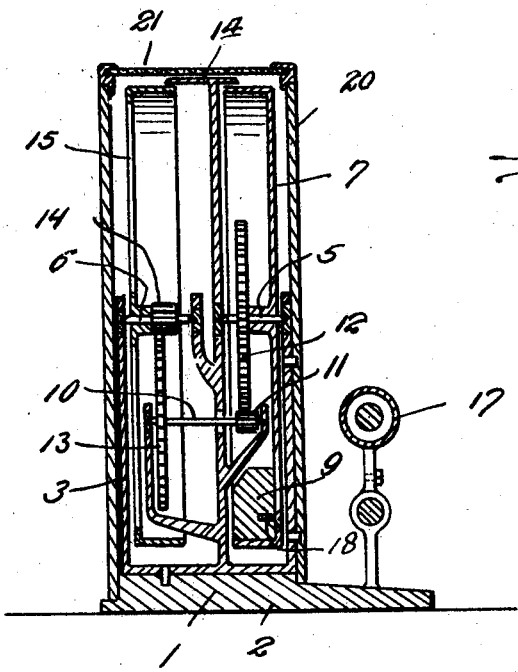
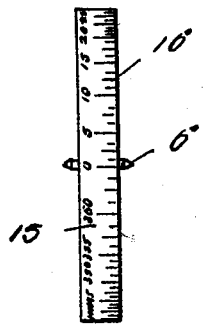
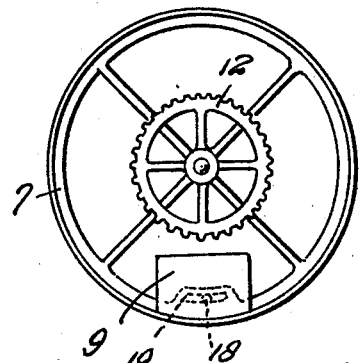
H. J. Halloran,
Inventor
By Clarence A. O'Brien
Attorney Patented Mar. 9, 1926.

1,576,437

UNITED STATES PATENT OFFICE.

HERMAN J. HALLORAN, OF ROSLINDALE, MASSACHUSETTS.

GRAVITY LEVEL.

Application filed February 12, 1924, Serial No. 692,314. Renewed October 16, 1925.

*To all whom it may concern:*

Be it known that HERMAN J. HALLORAN, a citizen of the United States, residing at Roslindale, in the county of Suffolk and State of Massachusetts, has invented certain new and useful Improvements in Gravity Levels, of which the following is a specification.

This invention relates to gravity levels and it consists in the novel features hereinafter described and claimed.

An object of the invention is to provide a gravity level which may be used in combination with a telescope for determining accurately in degrees and minutes the angle of inclination of a proposed, projected or imaginary line with relation to a true horizontal line.

With the above object in view, the level comprises a base member having a plane lower bearing surface. A dial wheel is journalled upon the base member at a point midway between the ends thereof and upon an axis which is disposed transversely of the base member and which lies in a plane parallel with the plane of the lower surface of the base member. A series of degree graduations are provided upon the periphery of the wheel and at a point diametrically opposite the zero graduation of the series of graduations there is positioned upon the wheel a weight and which will turn the wheel when the plane base surface of the base member is resting upon the true horizontal surface so that the zero graduation of the series of graduations will lie in a plane disposed at a right angle to the plane of the lower surface of the base member.

In the event that the lower surface of the base member is positioned upon an inclined surface, the weight, under the influence of gravity, will turn the dial wheel and bring a graduation of the series of graduations opposite the indicator which is disposed in a plane at a right angle to the under surface of the base member and this graduation will indicate in degrees the angle of inclination that has been assumed by the under surface of the base member with relation to a true horizontal line. A second dial wheel is operatively connected with the first mentioned dial wheel by gearings of certain relative proportions that the second mentioned dial wheel will indicate the fractional part of degrees or the minute which may be included in the measurement or calculation of the angle of degree of inclination of the position assumed by the under surface of the base member with relation to a true horizontal line. A telescope is mounted upon the base member and is disposed longitudinally thereof with its sight opening or axis disposed in a line truly parallel with the plane of the under surface of the base member. The telescope is disposed with its axis at a true right angle to the axis of the dial wheels and may be used for directing the level from a local point to a distal point to establish the angle at which the instrument is to be placed with relation to a horizontal and in order to determine the magnitude of the angle and as hereinbefore explained.

In the accompanying drawings:

Figure 3 is a transverse sectional view of the level, cut on the line 3—3 of Figure 1.

Figure 6 is an edge view of the dial wheel provided with a minute graduation.

Figure 7 is a side elevation of the dial wheel which carries the degrees.

Figure 1:
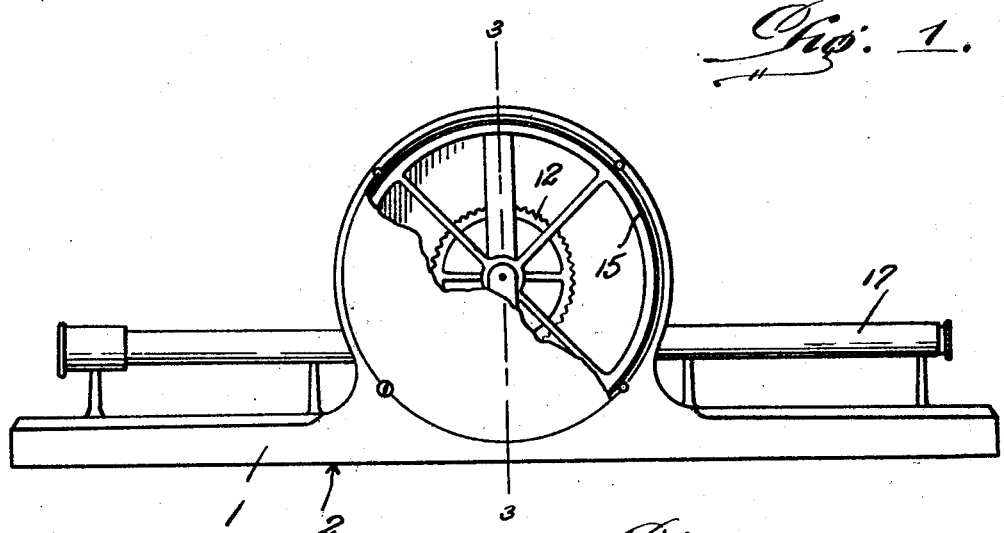
Figure 1 is a side elevation of the level with parts broken away.
Figure 2:
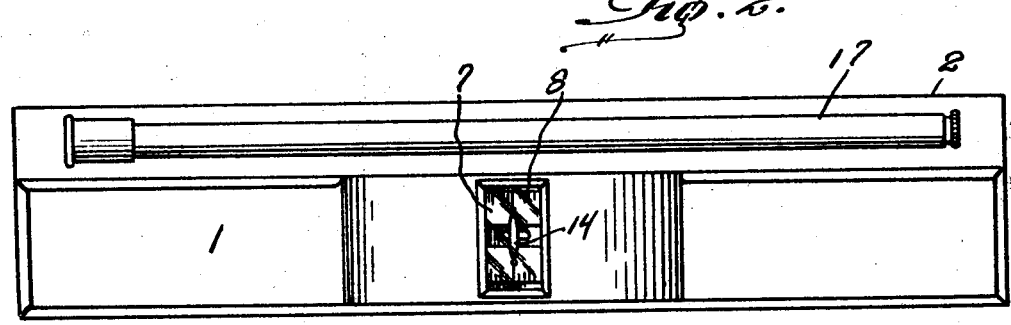
Figure 2 is a top plan view of the level.
Figure 4:
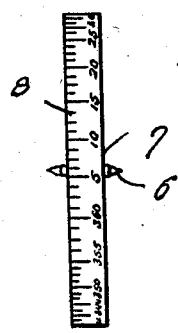
Figure 4 is an edge view of the dial wheel which is used in the level and which carries the degree graduations.
Figure 5:
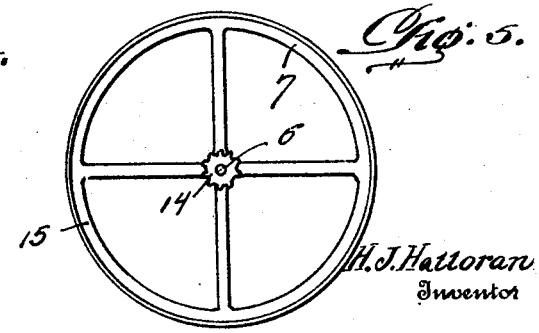
Figure 5 is a side view of the dial wheel used in the level and which carries the minute graduations.

The gravity level comprises a base member 1 which is provided with an under surface 2 lying in a true plane. A frame 3 is mounted upon the base member 1 at a point midway between the ends of the said base member. The frame 3 is provided at its upper portion with an indicator 4 which is disposed transversely of the base member and which lies in a plane parallel with the plane in which the surface 2 lies. Axes 5 and 6 are journalled in the frame 3 and are disposed in longitudinal alinement with each other. These axes are located exactly midway between the ends of the base member 1, they are disposed transversely of the said base, and they lie in a plane which intersects the plane of the surface 2 of the base member 1 at a true right angle. A dial wheel 7 is concentrically mounted upon the axis 5 and is provided upon its periphery with a series of degree graduation marks 8, the series including marks indicative of the number of degrees from zero to three hundred and sixty five. At a point diametrically opposite the zero mark of the series of graduations, the wheel 7 carries a weight 9 whereby when the surface 2 of the base member 1 is in a true horizontal position, the center of gravity of the weight 9 will be disposed directly under the axis 5 and the zero graduation of the series of graduations upon the wheel 7 will be under the indicator 4. When the surface 2 of the base member 1 is placed upon an inclined support or is positioned in an inclined position with relation to a horizontal line, the frame 3 and the indicator 4 is swung so that the indicator 4 is carried over another graduation of the series of graduations 8, and this graduation will indicate its degrees the angle of inclination of the position of the surface 2 of the base member 1 with relation to a true horizontal line.

A shaft 10 is journalled in the frame 3 below the axes 5 and 6 and carries at one end a relatively small gear wheel 11 which meshes with the teeth of a relatively large gear wheel 12 mounted upon the axis 5. A relatively large gear wheel 13 is mounted upon the other end portion of the shaft 10 and meshes with the teeth of a relatively small gear wheel 14 mounted upon the axis 6. Therefore in a turning movement which is made by the axis 5 is transmitted through the shaft and the intermeshing gear wheels through the axis 6. A dial wheel 15 is mounted upon the axis 6 and is provided upon its periphery with a series of graduations 16 which are indicative of the minutes or fractional parts of the degrees which may be included in the dimensions of the magnitude of the angle of inclination which is assumed by the surface 2 of the base member 1 with relation to a true horizontal line during the process of determining the factors in the use of the instrument. The graduation marks 16 are adapted to move under the indicator 4 and simultaneously with the movement of the series of graduations 8 provided upon the dial wheel 7, and thus the readings of the instrument are indicated simultaneously in degrees and minutes.

A telescope 17 is mounted upon the base member 1 and the axis or sight opening through the telescope is parallel with the median longitudinal dimension of the base member 1 and with the plane in which the under surface 2 thereof lies. The telescope 17 may be permanently fixed to the base member 1 or may be detachably mounted thereon as desired. The axis of the telescope 17 lies in a vertical plane which is disposed at a true right angle to the plane in which the axes 5 and 6 lie. To properly position the weight 9 upon the wheel 7 and to effect suitable adjustment thereof, the wheel is provided with a slotted lug 19 and through the slot of which passes a screw 18 which enters the weight 9 and consequently the said weight 9, by loosening the screw may be shifted with relation to the periphery of the wheel 7.

To determine the angle of inclination of a line which is to be established, projected or which may be imaginary, one end of the base member 1 is placed upon a fixed local point and the telescope 17 is trained upon a distally located object or point. Therefore the line between the local and the distal point is determined and the surface 2 of the base member 1 lies in a plane parallel with the said determined line. As the center of gravity of the weight 9 at all times lies in a perpendicular erected from a true horizontal line, and as hereinbefore described, the dial wheels 7 and 15 are turned whereby their respective series of graduations are brought under the indicator 4 and the angle of inclination of the said determined line with relation to a true horizontal line may be read as hereinbefore explained.

A casing 20 is disposed over the frame 3 and over the dial wheels 7 and 15 and is provided at its top side with a sight opening which is covered by a transparent panel of glass 21 and through the said opening and the transparency, the reading of the instrument may be observed and noted.

Having described the invention, what is claimed is:

1. A gravity level comprising a base provided with an under surface having all portions lying in the same plane, a frame mounted upon the base member and having an indicator disposed transversely of the base member and lying in a plane parallel with the plane of the under surface of the base member, a dial wheel journaled for rotation upon the frame and having a series of graduations adapted to move under the indicator, a weight mounted upon the dial wheel and located diametrically opposite the zero graduations of the series of graduations, a second wheel journaled upon the frame with its axis in alignment with the axis of the first mentioned wheel, a series of graduations carried by the second mentioned wheel and adapted to move under the indicator and gearings operatively connecting said dial wheels together.

2. A gravity level comprising a base member provided with an under surface having all portions lying in the same plane, a frame mounted upon the base member and having an indicator disposed transversely of the base member and lying in a plane parallel with the plane of the under surface of the base member, a dial wheel journaled for rotation upon the frame and having a series of graduations adapted to move under the indicator, a weight mounted upon the dial wheel and located diametrically opposite the zero graduations of the series of graduations, a second wheel journaled upon the frame with its axis in alignment with the axis of the first mentioned wheel, a series of graduations carried by the second mentioned wheel and adapted to move under the indicator, said wheels being of the same diameter, and gearings operatively connecting said dial wheels together.

In testimony whereof I affix my signature.

HERMAN J. HALLORAN.